United States Patent
Kang et al.

(10) Patent No.: US 9,722,418 B2
(45) Date of Patent: Aug. 1, 2017

(54) COMPLEX PROTECTION DEVICE

(71) Applicant: SMART ELECTRONICS INC., Ulsan (KR)

(72) Inventors: Doo Won Kang, Anyang-si (KR); Hyun Chang Kim, Ulsan (KR); Kwang Beom Kim, Yangsan-si (KR); Saeng Soo Yun, Busan (KR); Hyuk Jae Kwon, Busan (KR)

(73) Assignee: SMART ELECTRONICS INC., Ulsan (KR)

( * ) Notice: Subject to any disclaimer, the term of this patent is extended or adjusted under 35 U.S.C. 154(b) by 414 days.

(21) Appl. No.: 14/632,922

(22) Filed: Feb. 26, 2015

(65) Prior Publication Data
US 2015/0249332 A1  Sep. 3, 2015

(30) Foreign Application Priority Data
Feb. 28, 2014  (KR) .................. 10-2014-0024266

(51) Int. Cl.
*H01H 37/04*  (2006.01)
*H02H 9/04*  (2006.01)

(52) U.S. Cl.
CPC .................. *H02H 9/044* (2013.01)

(58) Field of Classification Search
CPC ......... H02H 9/041; H02H 9/042; H02H 9/044
See application file for complete search history.

(56) References Cited

U.S. PATENT DOCUMENTS

| | | | | |
|---|---|---|---|---|
| 6,344,633 | B1* | 2/2002 | Furuuchi | H01H 85/463 219/481 |
| 6,351,361 | B1* | 2/2002 | Kawazu | H01H 85/463 337/290 |
| 2012/0112871 | A1 | 5/2012 | Chen et al. | |

FOREIGN PATENT DOCUMENTS

| | | | |
|---|---|---|---|
| JP | 59-100501 | A | 6/1984 |
| JP | 2000-323308 | A | 11/2000 |
| JP | 2007123129 | * | 5/2007 |
| KR | 10-0216418 | B | 8/1999 |
| KR | 10-2001-0006916 | A | 1/2001 |
| KR | 10-2007-0009720 | A | 1/2007 |
| TW | 200915371 | A | 4/2009 |

(Continued)

*Primary Examiner* — Thienvu Tran
*Assistant Examiner* — Tien Mai
(74) *Attorney, Agent, or Firm* — Novick, Kim & Lee, PLLC; Jae Youn Kim

(57) ABSTRACT

Disclosed is a complex protection device including a substrate, fuse terminals provided on the substrate, first resistive terminals provided on the substrate so as to be separated from the fuse terminals, second resistive terminals provided on the substrate opposite to the first resistive terminals across the fuse terminals, a fusible element connected to the fuse terminals, a first surface-mounted resistive element connected to the first resistive terminals, a second surface-mounted resistive element connected to the second resistive terminals, at least one printed resistive element connected to at least one of the first resistive terminals and the second resistive terminals and connected to at least one of the first surface-mounted resistive element and the second surface-mounted resistive element, and a switching element controlling flow of current to the first and second surface-mounted resistive elements and the at least one printed resistive element if overvoltage is applied.

6 Claims, 12 Drawing Sheets

(56) References Cited

FOREIGN PATENT DOCUMENTS

TW 201030791 A 8/2010
TW 201405881 A 2/2014

\* cited by examiner (WHEN OVERVOLTAGE IS APPLIED)

COMPLEX PROTECTION DEVICE

BACKGROUND OF THE INVENTION

Field of the Invention

The present invention relates to a complex protection device, and more particularly to a complex protection device in which both surface-mounted resistive elements and printed resistive elements are installed and thus a circuit and circuit elements installed on the circuit may be protected from overvoltage as well as overcurrent, and the printed resistive elements are disposed under the surface-mounted resistive elements and thus product miniaturization may be achieved.

Description of the Related Art

A non-return type protection device, operated in response to excessive heat generated by overcurrent of a protected apparatus or ambient temperature, is operated at a designated temperature and intercepts an electrical circuit. For example, there is a protection device heating a resistor in response to signal current detecting abnormality of an apparatus and operating a fuse element using generated heat.

Korean Patent Laid-open No. 10-2001-0006916 discloses a protection device in which low melting point metal body electrodes and a heating element are provided on a protection device substrate, a low melting metal body is formed directly on the low melting point metal body electrodes and the heating element, an inner sealing part formed of a solid flux is installed on the low melting metal body so as to prevent surface oxidation of the low melting metal body, and an outer sealing part or a cap to prevent melt from leaking to the outside of the device during breakage of the low melting metal body is installed on the outer surface of the inner sealing part.

FIGS. 11A and 11B illustrate another conventional protection device in which a fusible element (a low melting point metal body) is formed on a resistor (a heating element).

With reference to FIGS. 11A and 11B, in the conventional protection device, a paste-type resistor 2 is applied to a ceramic substrate 1, an insulator 3, fuse terminals 4, a fusible element 5, and a case 6 are sequentially stacked on the resistor 2, and a connection part 4a of the fuse terminal 4 is connected to a resistive terminal 8.

In such a conventional protection device, the fusible element 5 is installed on the resistor 2 and thus, the thickness of the protection device is increased.

Further, since the paste-type resistor 2 is used, the protection device has weak durability insufficient to be applied for high power and is difficult to cope with various environments.

SUMMARY OF THE INVENTION

Therefore, the present invention has been made in view of the above problems, and it is an object of the present invention to provide a complex protection device in which both surface-mounted resistive elements and printed resistive elements are installed and thus a circuit and circuit elements installed on the circuit may be protected from overvoltage as well as overcurrent.

It is another object of the present invention to provide a complex protection device in which printed resistive elements are disposed under surface-mounted resistive elements and thus product miniaturization may be achieved.

It is another object of the present invention to provide a complex protection device in which surface-mounted resistive elements and printed resistive elements are mounted on a substrate without lead wires and thus an automation process may be easily applied.

It is another object of the present invention to provide a complex protection device which may be optimally designed according to a desired resistance value or electric power by combining various resistive elements having different structures.

It is another object of the present invention to provide a complex protection device in which surface-mounted resistive elements and printed resistive elements are installed at both sides of a fusible element and thus, thermal characteristics may be improved, breaking time of the fusible element may be shortened if overvoltage is applied, and a sufficient insulating distance may be acquired.

It is yet another object of the present invention to provide a complex protection device in which surface-mounted resistive elements and printed resistive elements possess terminals in common and thus, structure simplification and product miniaturization may be achieved.

According to an aspect of the present invention, there is provided a complex protection device comprising: a substrate; fuse terminals provided on the substrate; first resistive terminals provided on the substrate so as to be separated from the fuse terminals; second resistive terminals provided on the substrate opposite to the first resistive terminals across the fuse terminals; a fusible element connected to the fuse terminals; a first surface-mounted resistive element connected to the first resistive terminals;

a second surface-mounted resistive element connected to the second resistive terminals; at least one printed resistive element connected to at least one of the first resistive terminals and the second resistive terminals and connected to at least one of the first surface-mounted resistive element and the second surface-mounted resistive element; and a switching element controlling flow of current to the first and second surface-mounted resistive elements and the at least one printed resistive element if overvoltage is applied.

In the complex protection device, the at least one printed resistive element is disposed under the first and second surface-mounted resistive elements.

In the complex protection device, the first and second surface-mounted resistive elements and the at least one printed resistive element are connected to the same resistive terminals.

In the complex protection device, each of the first and second resistive terminals includes a surface-mounted resistive terminal part to which one of the first and second surface-mounted resistive elements is connected, a printed resistive terminal part to which the at least one printed resistive element is connected, and a connection part connecting the surface-mounted resistive terminal part and the printed resistive terminal part, and the surface-mounted resistive terminal part, the printed resistive terminal part and the connection part are integrally formed.

In the complex protection device, the at least one printed resistive element includes first and second printed resistive elements respectively disposed under the first and second surface-mounted resistive elements.

In the complex protection device, the first and second surface-mounted resistive elements are connected in parallel and the first and second printed resistive elements are connected in parallel.

In the complex protection device, first and second connection terminals are formed between the first and second resistive elements; a first insulating layer, a conductive layer, and a second insulating layer are sequentially stacked on the upper surfaces of the first and second connection terminals;

the fusible element, the first and second surface-mounted resistive elements, and the first and second printed resistive elements are installed on the second insulating layer, and a hole is formed on the second insulating layer so that the fusible element and the conductive layer may be connected through the hole.

In the complex protection device, the first surface-mounted resistive element and the first printed resistive element are connected in parallel, and the second surface-mounted resistive element and the second printed resistive element are connected in parallel, and the first and second surface-mounted resistive elements are connected in series, and the first and second printed resistive elements are connected in series.

According to the complex protection device of the present invention as described above, it is possible to provide a complex protection device in which both surface-mounted resistive elements and printed resistive elements are installed and thus a circuit and circuit elements installed on the circuit may be protected from overvoltage as well as overcurrent.

Also, it is possible to provide a complex protection device in which printed resistive elements are disposed under surface-mounted resistive elements and thus product miniaturization may be achieved.

Also, it is possible to provide a complex protection device in which surface-mounted resistive elements and printed resistive elements are mounted on a substrate without lead wires and thus an automation process may be easily applied.

Also, it is possible to provide a complex protection device which may be optimally designed according to a desired resistance value or electric power by combining various resistive elements having different structures.

Also, it is possible to provide a complex protection device in which surface-mounted resistive elements and printed resistive elements are installed at both sides of a fusible element and thus, thermal characteristics may be improved, breaking time of the fusible element may be shortened if overvoltage is applied, and a sufficient insulating distance may be acquired.

Also, it is possible to provide a complex protection device in which surface-mounted resistive elements and printed resistive elements possess terminals in common and thus, structure simplification and product miniaturization may be achieved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, preferred embodiments of the present invention will be described in detail with reference to the annexed drawings.

Figure 1:
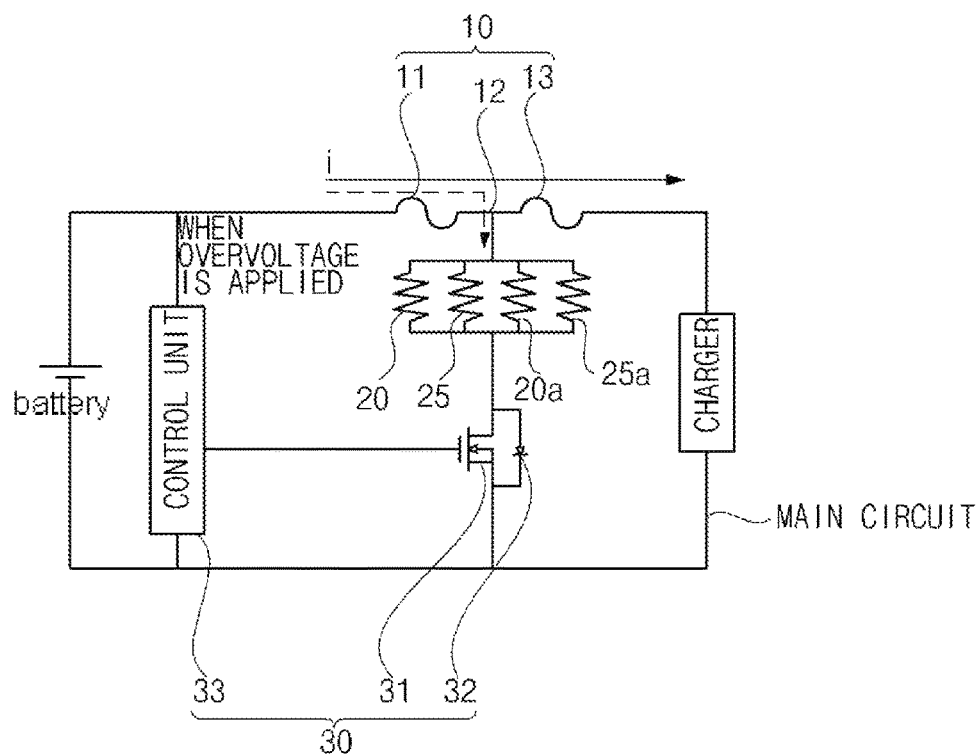
FIG. 1 is a circuit diagram illustrating a complex protection device in use in accordance with the present invention.

With reference to FIG. 1, a complex protection device in accordance with the present invention serves to protect elements connected to a main circuit in an abnormal state by breaking a fusible element 10 connected to the main circuit.

The main circuit to which the complex protection device in accordance with the present invention is applied is not limited in kinds and, for example, the main circuit may be a charging circuit in which charging of a battery is performed.

The fusible element 10 and a battery are connected and a charger and the fusible element 10 are connected on the main circuit.

In more detail, a plurality of resistive elements 20, 20a, 25, and 25a connected to the fusible element 10 and a switching element 30 connected to the plurality of resistive elements 20, 20a, 25, and 25a may be provided on the main circuit.

The switching element 30 may exemplarily include a diode 32, a transistor 31, and a control unit 33 applying a control signal turning the transistor 31 on so as to control current flow to the resistive elements 20, 20a, 25, and 25a if overvoltage is applied.

First, if overcurrent is applied to the main circuit, the fusible element 10 is broken by heat generated by such overcurrent and thus protects the circuit and circuit elements.

Further, if overvoltage is applied to the main circuit, the fusible element 10 is broken by heat generated from the resistive elements 20, 20a, 25, and 25a.

Figure 2:
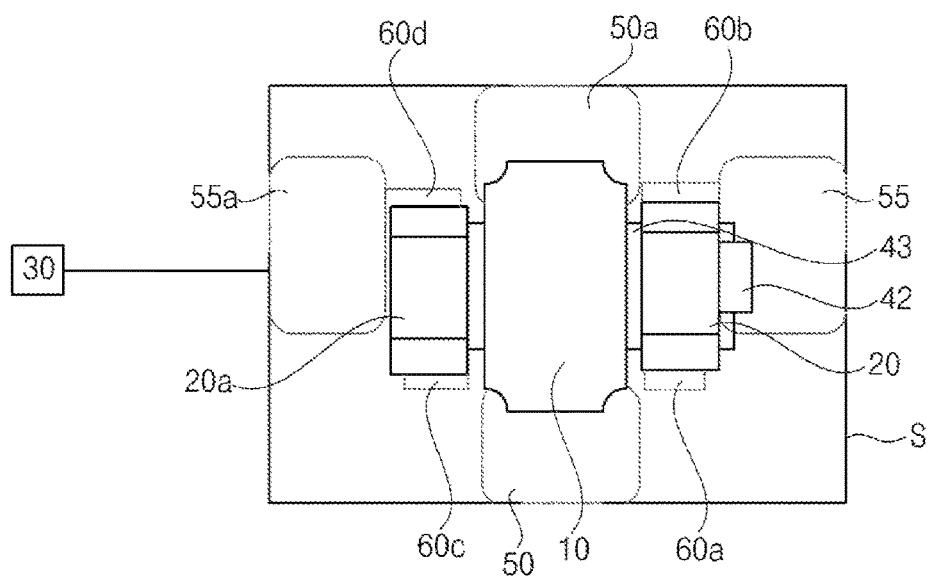
FIG. 2 is a plan view illustrating a complex protection device in accordance with one embodiment of the present invention.
Figure 3A:
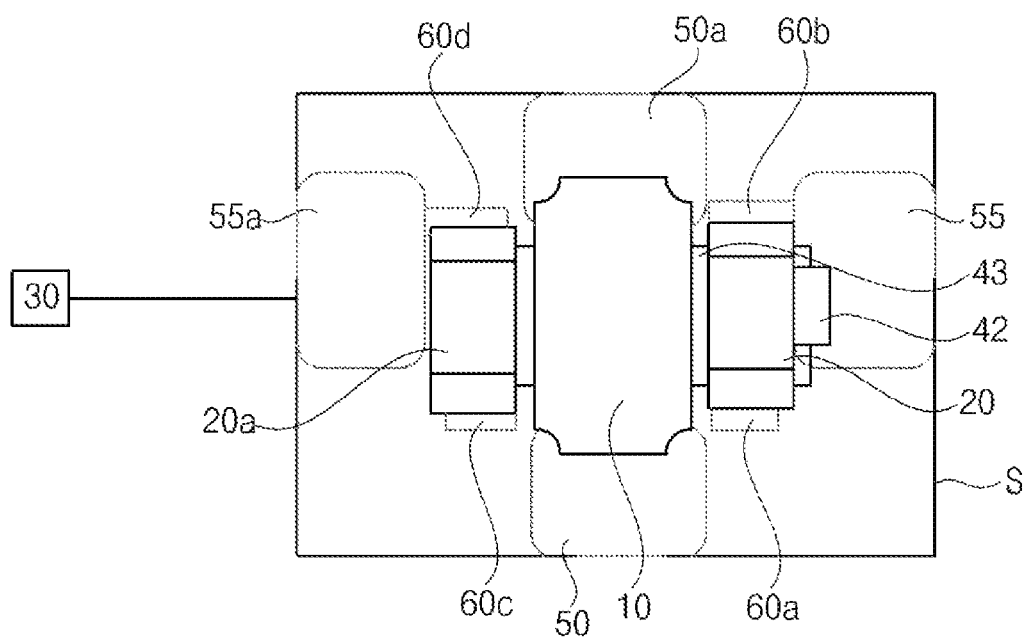
FIGS. 3A and 3B are perspective and exploded perspective views illustrating the complex protection device in accordance with the embodiment of the present invention.
Figure 3B:
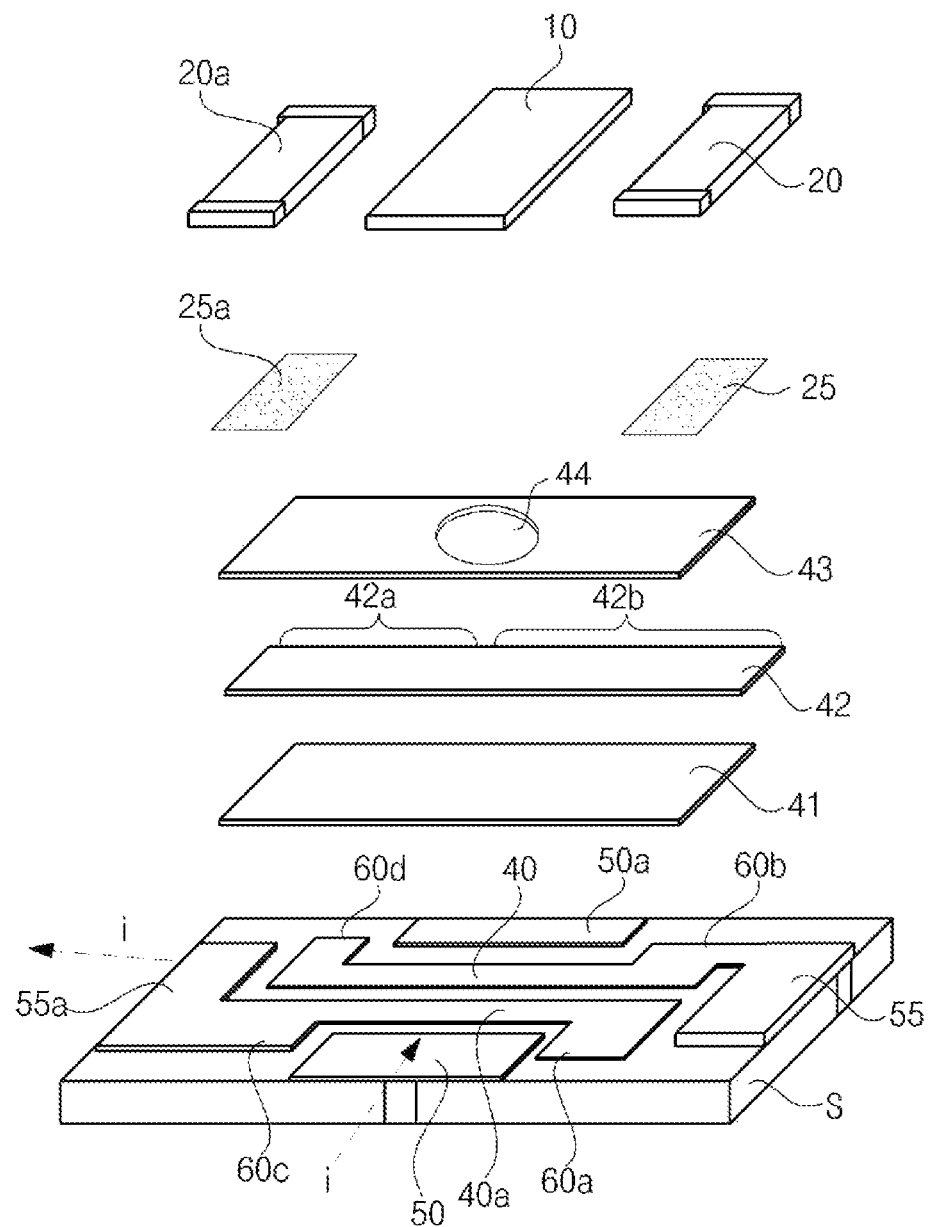

With reference to FIGS. 2 to 3B, the complex protection device in accordance with the present invention includes a substrate S, and the fusible element 10, the resistive elements 20, 20a, 25, and 25a, and the switching element 30 are installed on the substrate S. The resistive elements 20, 20a, 25, and 25a include surface-mounted resistive elements 20 and 20a and printed resistive elements 25 and 25a.

In order to install the fusible element 10 and the resistive elements 20, 20a, 25, and 25a on the substrate S, fuse terminals 50 and 50a, first resistive terminals 60a and 60b, second resistive terminals 60c and 60d, first and second connection terminals 40 and 40*a,* and first and second terminals 55 and 55*a* are formed on the substrate S.

The fuse terminals 50 and 50*a,* the first resistive terminals 60*a* and 60*b,* and the second resistive terminals 60*c* and 60*d* are installed so as to be separated from each other on the same plane.

The fusible element 10 is installed on the fuse terminals 50 and 50*a.*

A first surface-mounted resistive element 20 and a first printed resistive element 25 are installed on the first resistive terminals 60*a* and 60*b,* and a second surface-mounted resistive element 20*a* and a second printed resistive element 25*a* are installed on the second resistive terminals 60*c* and 60*d.*

The first and second connection terminals 40 and 40*a* serve to connect the first resistive terminals 60*a* and 60*b* and the second resistive terminals 60*c* and 60*d.* The first connection terminal 40 connects the first resistive terminal 60*b* and the second resistive terminal 60*d,* and the second connection terminal 40*a* connects the first resistive terminal 60*a* and the second resistive terminal 60*c.*

The first terminal 55 is connected to the first resistive terminal 60*b,* and the second terminal 55*a* is connected to the second resistive terminal 60*c.*

The fusible element 10 is connected to the fuse terminals 50 and 50*a,* and is broken and thus serves to protect the circuit and the circuit elements if overcurrent is applied to the main circuit.

The fusible element 10 may be exemplarily formed of a metal or an alloy having a melting point of 120~300° C.

The first and second surface-mounted resistive elements 20 and 20*a* generate heat and thus serve to break the fusible element 10 if overvoltage is applied. The first and second surface-mounted resistive elements 20 and 20*a* may be disposed at both sides of the fusible element 10.

Figure 4A:
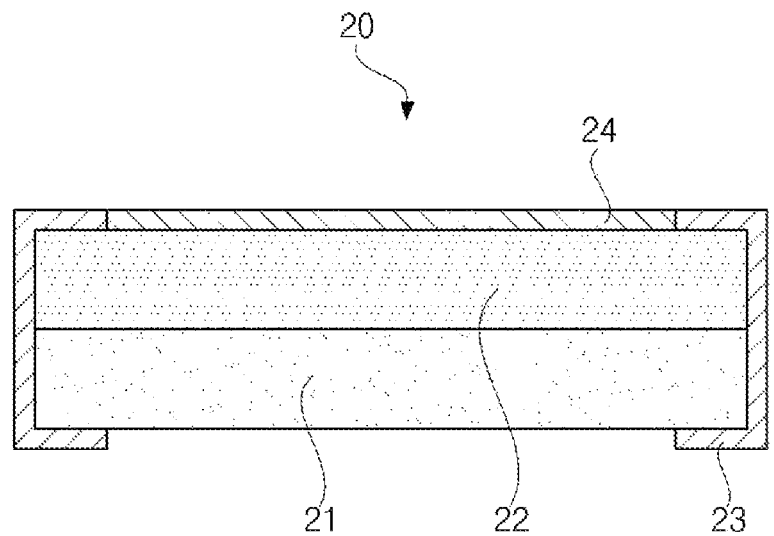
FIGS. 4A and 4B are cross-sectional views of resistive elements in accordance with the present invention.

With reference to FIG. 4A, each of the first and second surface-mounted resistive elements 20 and 20*a* may include an element body 21 formed of ceramic, terminal parts 23 formed at both ends of the element body 21, a resistive layer 22 formed on the upper surface of the element body 21, and a coating layer 24 protecting the resistive layer 22.

Figure 4B:
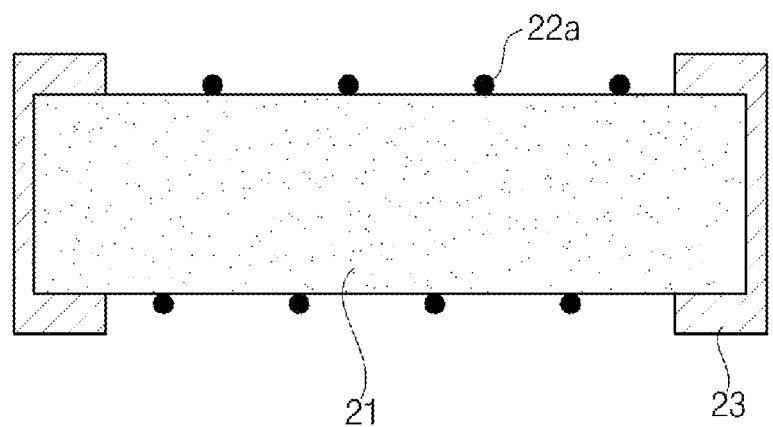

With reference to FIG. 4B, each of the first and second surface-mounted resistive elements 20 and 20*a* may be a resistive element including an element body 21, terminal parts 23 formed at both ends of the element body 21, and a coil 22*a* wound on the outer circumferential surface of the element body 21. However, embodiments of the present invention are not limited thereto, and each of the first and second surface-mounted resistive elements 20 and 20*a* may be one of a resistive element provided with a spiral groove and other kinds of resistive elements, such as an MELF type resistive element and a chip type resistive element.

The first and second printed resistive elements 25 and 25*a* generate heat and thus serve to provide such heat to the fusible element 10 if overvoltage is applied, in the same manner as the first and second surface-mounted resistive elements 20 and 20*a.*

The first and second printed resistive elements 25 and 25*a* may be disposed under the first and second surface-mounted resistive elements 20 and 20*a,* in more detail, in spaces formed among both terminal parts 23 and the element bodies 21.

A first insulating layer 41, a conductive layer 42, and a second insulating layer 43 are sequentially stacked on the first and second connection terminals 40 and 40*a.*

The first insulating layer 41 serves to electrically isolate the first and second connection terminals 40 and 40*a* and the conductive layer 42 from each other.

The conductive layer 42 serves to electrically connect the fusible element 10 to the first and second surface-mounted resistive elements 20 and 20*a* and the first and second printed resistive elements 25 and 25*a,* and is configured such that one end of the conductive layer 42 is connected to the first terminal 55 and connection of the other end of the conductive layer 42 to the second terminal 55*a* is interrupted. Further, the conductive layer 42 may be formed by applying a silver (Ag) paste to the upper surface of the first insulating layer 41.

The second insulating layer 43 serves to electrically isolate the conductive layer 42 and the first and second surface-mounted resistive elements 20 and 20*a* and printed resistive elements 25 and 25*a.*

The fusible element 10, the first and second surface-mounted resistive elements 20 and 20*a,* and the first and second printed resistive elements 25 and 25*a* are installed on the second insulating layer 43.

A hole 44 is formed on the second insulating layer 43 so that the fusible element 10 and the conductive layer 42 may be connected through the hole 44.

Figure 5A:
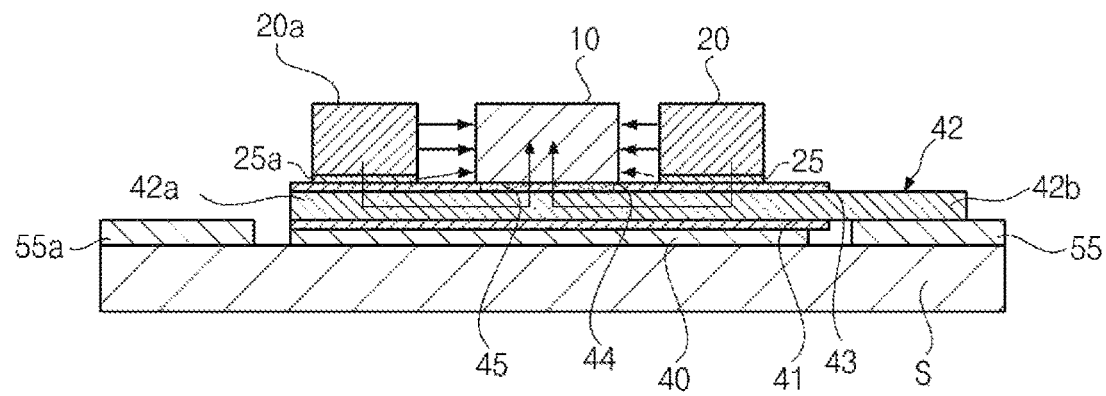
FIGS. 5A and 5B are cross-sectional views of FIG. 3A taken along line A-A and line B-B.

With reference to FIG. 5A, a part of the conductive layer is exposed through the hole 44 and is connected to the fusible element 10 by applying a conductive material, such as a solder paste 45, to the surface of the exposed part of the breaking induction part 42*c.*

If overvoltage is applied to the main circuit, current flows in order of the fusible element 10, the conductive layer 42 and the first terminal 55.

With reference to FIGS. 5A and 3B, current applied to the fusible element 10 is branched off in the middle of the fusible element 10 and flows to the first terminal 55 via the conductive layer 42. Current applied to the first terminal 55 passes through the first and second surface-mounted resistive elements 20 and 20*a* which are connected in parallel using the first and second connection terminals 40 and 40*a* and then flows to the second terminal 55*a.* Since the first printed resistive element 25 possess the first resistive terminals 60*a* and 60*b* in common with the first surface-mounted resistive element 20 and the second printed resistive element 25*a* possess the second resistive terminals 60*c* and 60*d* in common with the second surface-mounted resistive element 20*a,* the first and second surface-mounted resistive elements 20 and 20*a* are connected in parallel and the first and second printed resistive elements 25 and 25*a* are connected in parallel, and current applied to the first terminal 55 is branched off, flows to the first and second surface-mounted resistive elements 20 and 20*a* and the first and second printed resistive elements 25 and 25*a,* and then joins at the second terminal 55*a.*

The first and second surface-mounted resistive elements 20 and 20*a* and the first and second printed resistive elements 25 and 25*a* generate heat at both sides of the fusible element 10 by current flowing in the first and second surface-mounted resistive elements 20 and 20*a* and the first and second printed resistive elements 25 and 25*a,* and such heat heats the fusible element 10 by radiation and heats the fusible element 10 through the heat transfer part 42*a* and the conductive part 42*b* of the conductive layer 42 by conduction and thus, breaks the fusible element 10. However, in the conductive layer 42, the heat transfer part 42*a* may be omitted.

Figure 5B:
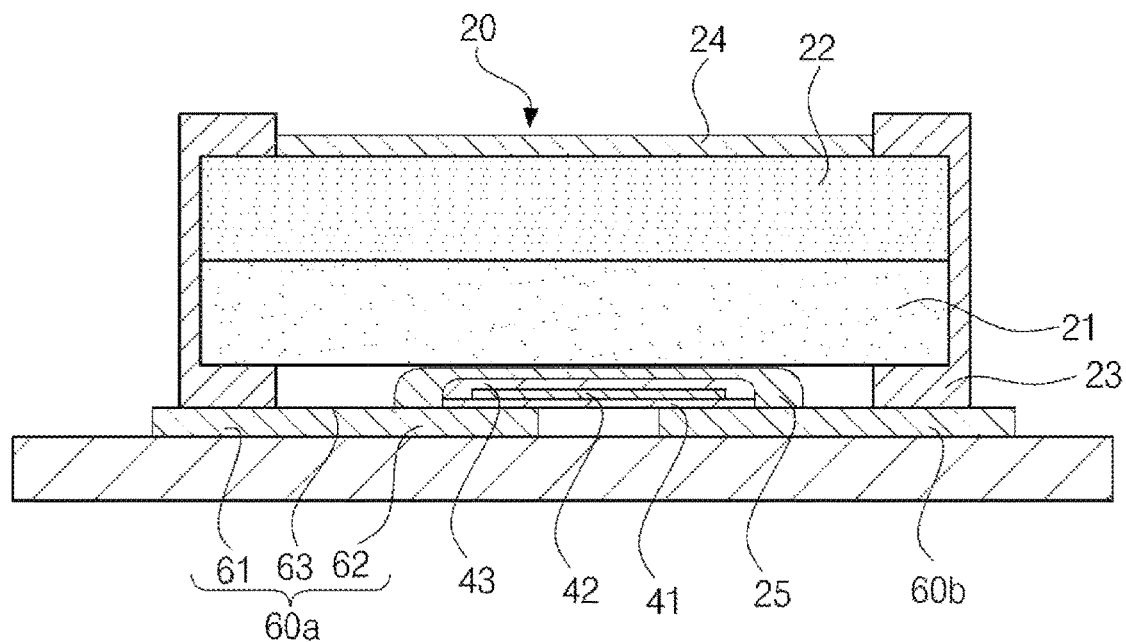

With reference to FIG. 5B, both the first surface-mounted resistive element 20 and the first printed resistive element 25 are connected to the first resistive terminals 60*a* and 60*b.*

Each of the first resistive terminals 60*a* and 60*b* may include a surface-mounted resistive terminal part 61 to which the first surface-mounted resistive element 20 is connected, a printed resistive terminal part 62 to which the first printed resistive element 25 is connected, and a connection part 63 connecting the surface-mounted resistive terminal part 61 and the printed resistive terminal part 62. The surface-mounted resistive terminal part 61, the printed resistive terminal part 62, and the connection part 63 are integrally formed.

The first printed resistive element 25 is formed of a thin film formed on the first resistive terminals 60 and 60a and the second insulating layer 43 through a printing method and is disposed in a space formed under the first surface-mounted resistive element 20. Therefore, the overall thickness of the complex protection device is not increased.

Therefore, although both the surface-mounted resistive elements and the printed resistive elements are installed, product miniaturization may be achieved.

Further, since the printed resistive elements divide current or voltage, thermal characteristics are improved and thus, breaking time of the fusible element may be shortened.

Figure 6:
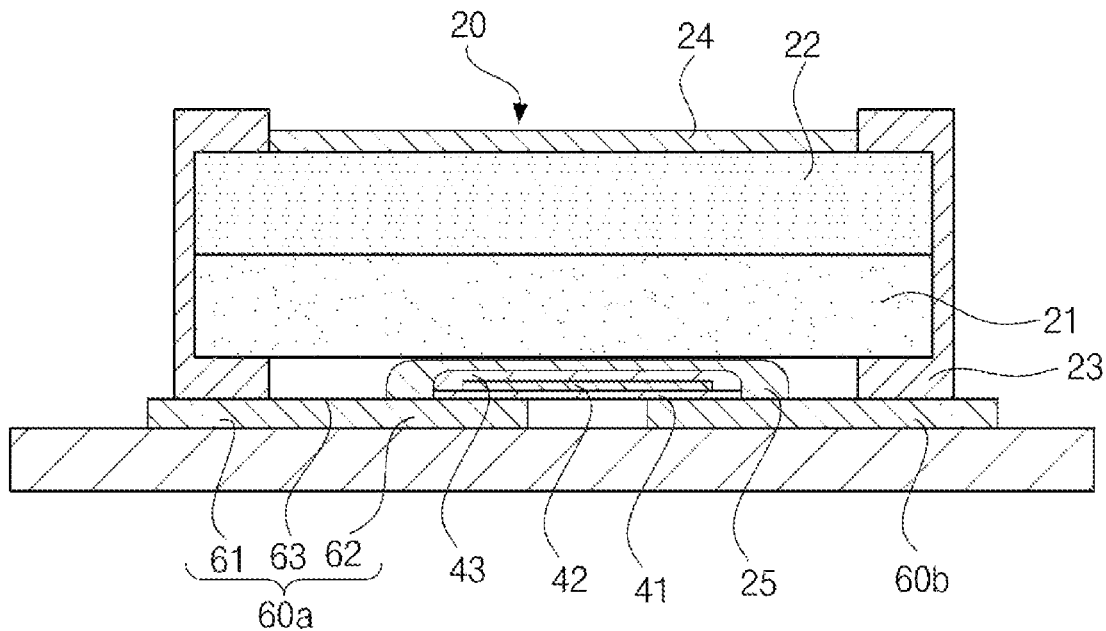
FIG. 6 is a cross-sectional view illustrating resistive terminals having a structure differing from resistive terminals of FIG. 5B.

With reference to FIG. 6, in this embodiment, each of the resistive terminals 60a and 60b includes a surface-mounted resistive terminal part 61 and a printed resistive terminal part 62.

That is, the surface-mounted resistive element 20 and the printed resistive element 25 are not connected to the same resistive terminal, as exemplarily shown in FIG. 5B, but may be connected to resistive terminal parts 61 and 62 which are separated from each other.

However, the resistive terminal shown in FIG. 6 has a smaller width than the resistive terminal shown in FIG. 5B and thus, has low stability and is in danger of explosion as compared to the resistive terminal shown in FIG. 5B, if a resistance value or electric power is increased. Therefore, if a resistance value or electric power is increased, increase in the width of the resistive terminal and connection of the surface-mounted resistive element and the printed resistive element to the same resistive terminal is advantageous in terms of improvement in durability and prevention of circuit explosion.

Moreover, since the first and second surface-mounted resistive elements 20 and 20a and the first and second printed resistive elements 25 and 25a in accordance with the present invention are mounted on the substrate S without lead wires, an automation process may be easily applied.

Figure 7A:
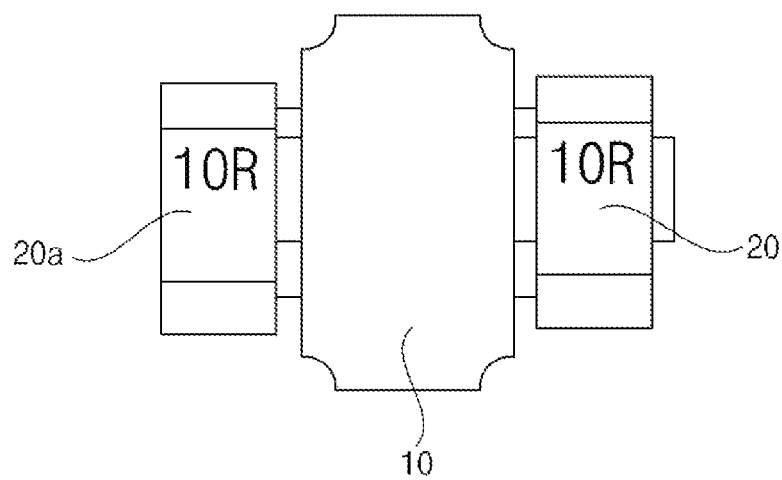
FIGS. 7A to 7C are plan views illustrating arrangements of first and second surface-mounted resistive elements in accordance with the present invention.

With reference to FIG. 7A, the first and second surface-mounted resistive elements 20 and 20a are connected in parallel at both sides of the fusible element 10. The first and second surface-mounted resistive elements 20 and 20a may have the same reference value 10R, or have different reference values 20R and 10R, as exemplarily shown in FIGS. 7B and 7C.

Figure 7B:
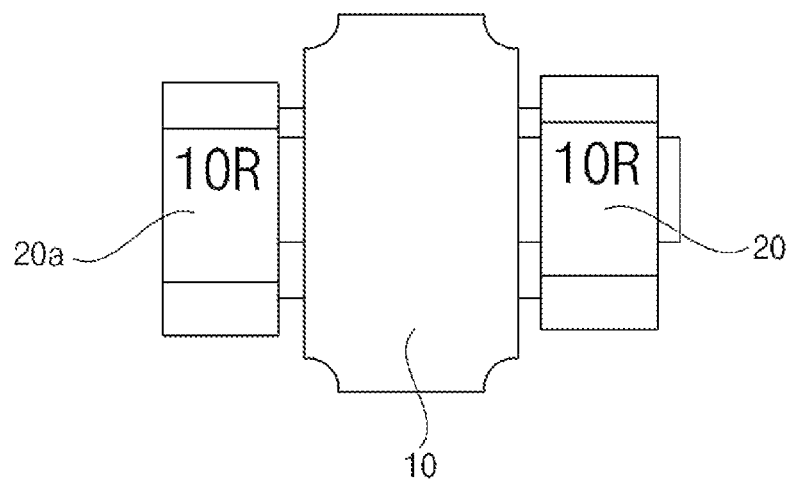
Figure 7C:
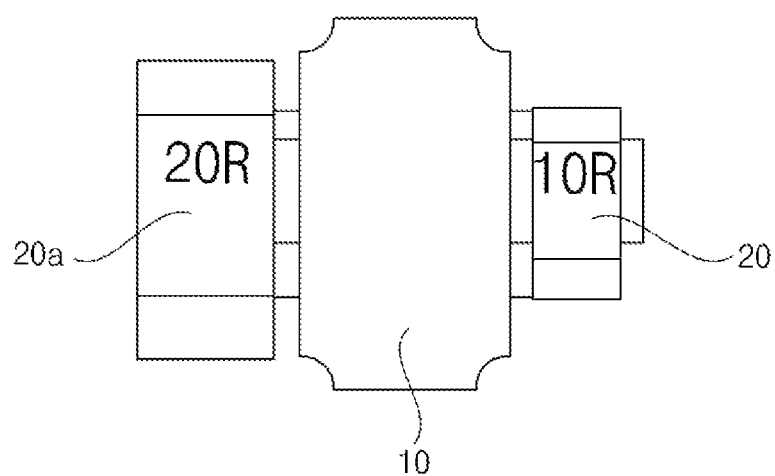

Further, if the first and second surface-mounted resistive elements 20 and 20a have different reference values 20R and 10R, as exemplarily shown in FIGS. 7B and 7C, the first surface-mounted resistive element 20 may have a smaller resistance value than the second surface-mounted resistive element 20a but have a size corresponding to the second surface-mounted resistive element 20a (with reference to FIG. 7B) or a smaller size than the second surface-mounted resistive element 20a (with reference to FIG. 7C).

Although not shown in the drawings, the first and second printed resistive elements may have various combinations of reference values, in the same manner as the first and second surface-mounted resistive elements 20 and 20a of FIGS. 7A to 7C. Further, the plural printed resistive elements may not be provided, and only the first or second printed resistive element may be provided as needed.

As described above, in the complex protection device in accordance with the present invention, resistance values and sizes/shapes of the plural resistive elements may be variously combined. Therefore, the present invention may provide a complex protection device which increases a degree of freedom in circuit design through various combinations of resistive elements and is optimized according to product characteristics.

Further, in the complex protection device in accordance with the present invention, two kinds of resistive elements are combined according to an amount of electric power and thus, both stability/durability and miniaturization may be satisfied.

Figure 8A:
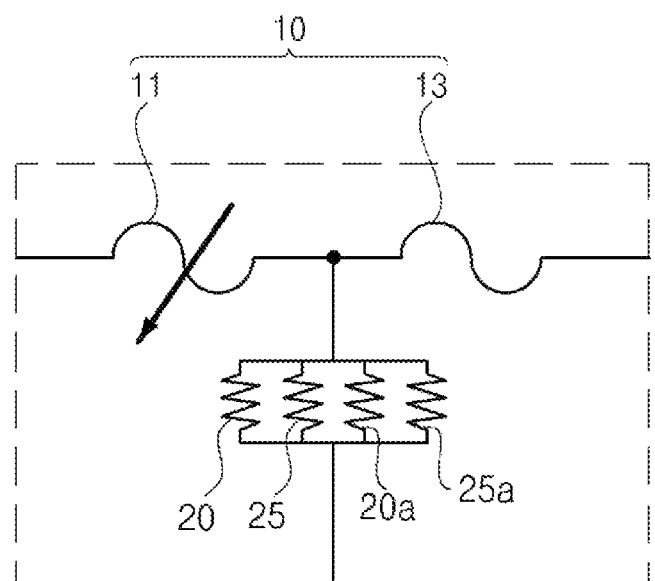
FIGS. 8A and 8B are a circuit diagram and a plan view illustrating breakage of a fusible element if overcurrent is applied to a main circuit.
Figure 8B:
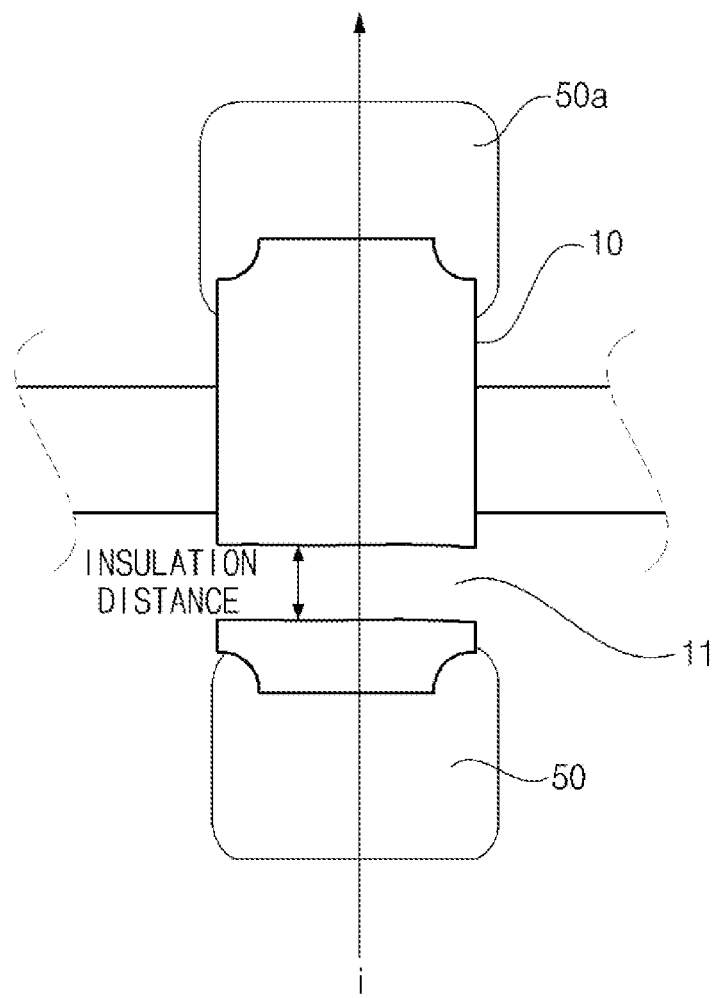

FIGS. 8A and 8B are a circuit diagram and a plan view illustrating breakage of the fusible element if overcurrent is applied to the main circuit.

With reference to FIGS. 8A and 8B, if overcurrent, such as surge current momentarily introduced into the main circuit, is applied to the main circuit, the fusible element 10 is momentarily broken by heat generated due to the surge current.

Here, since a front end region 11 of the fusible element is broken and the main circuit is intercepted, damage or explosion of the main circuit is prevented.

Figure 9A:
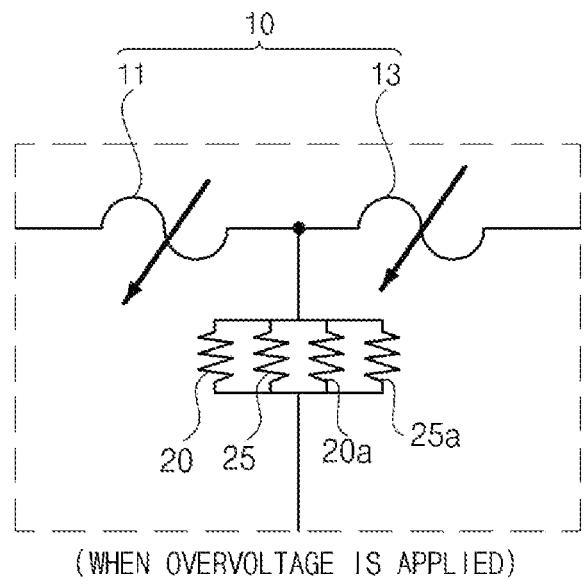
FIGS. 9A and 9B are a circuit diagram and a plan view illustrating breakage of the fusible element in accordance with the present invention.
Figure 9B:
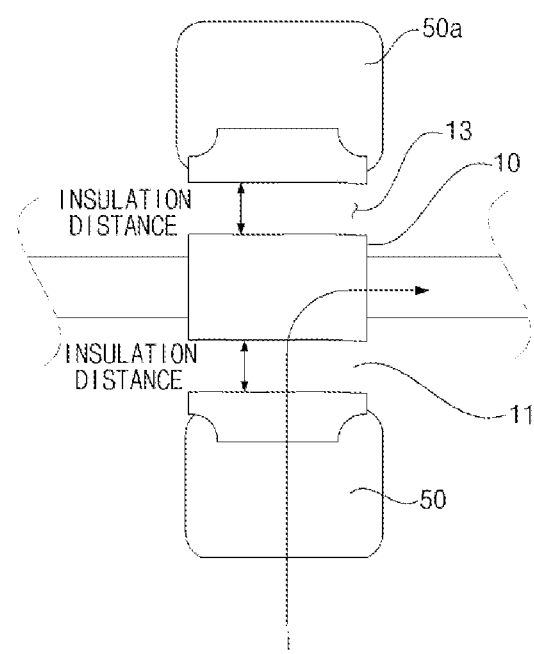

With reference to FIGS. 9A and 9B, if overvoltage deviating from reference voltage is applied to the main circuit, as described above, the switching element 30 controls flow of current to the resistive elements 20, 20a, 25, and 25a (with reference to FIG. 1). Then, the front end region 11 and a rear end region 13 of the fusible element 10 are broken by heat generated from the resistive elements 20, 20a, 25, and 25a by current introduced to the resistive elements 20, 20a, 25, and 25a.

Figure 10:
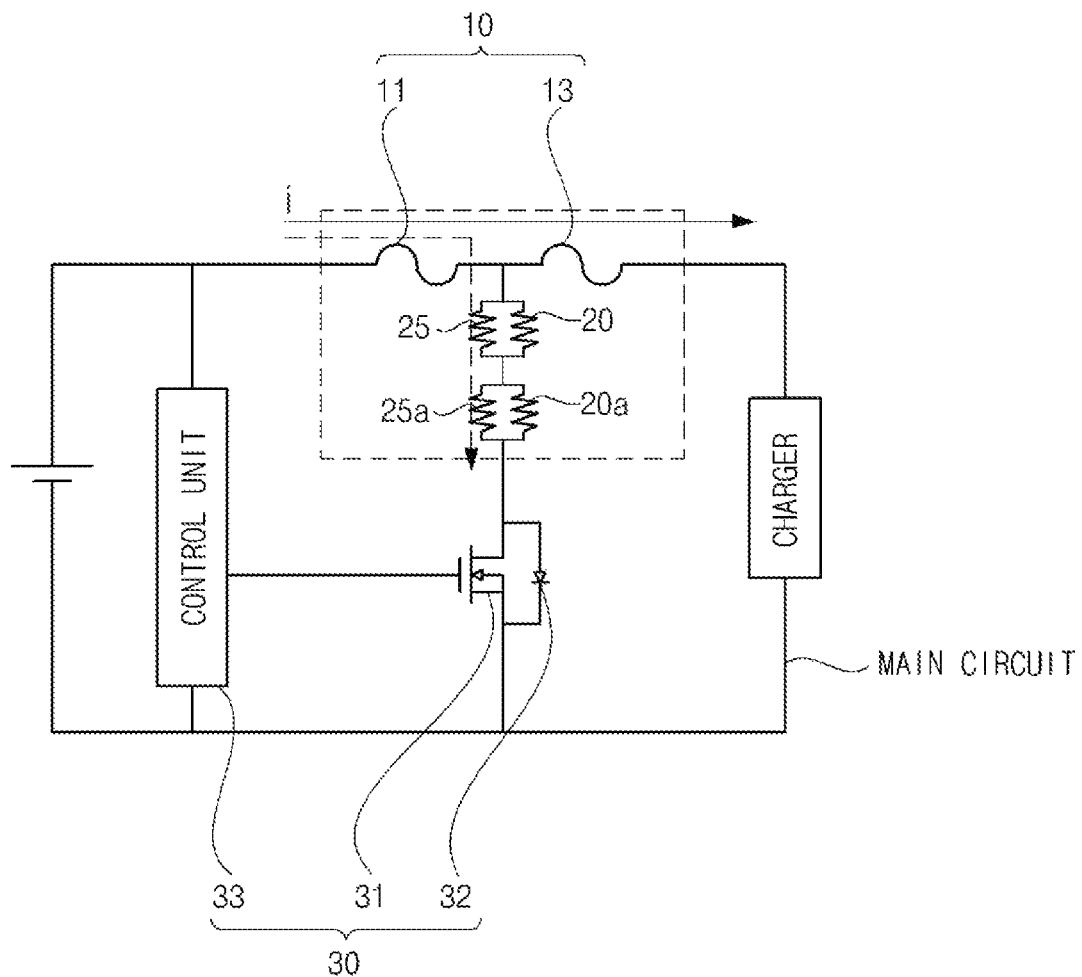
FIG. 10 is a circuit diagram illustrating a complex protection device in accordance with another embodiment of the present invention.
Figure 11A:
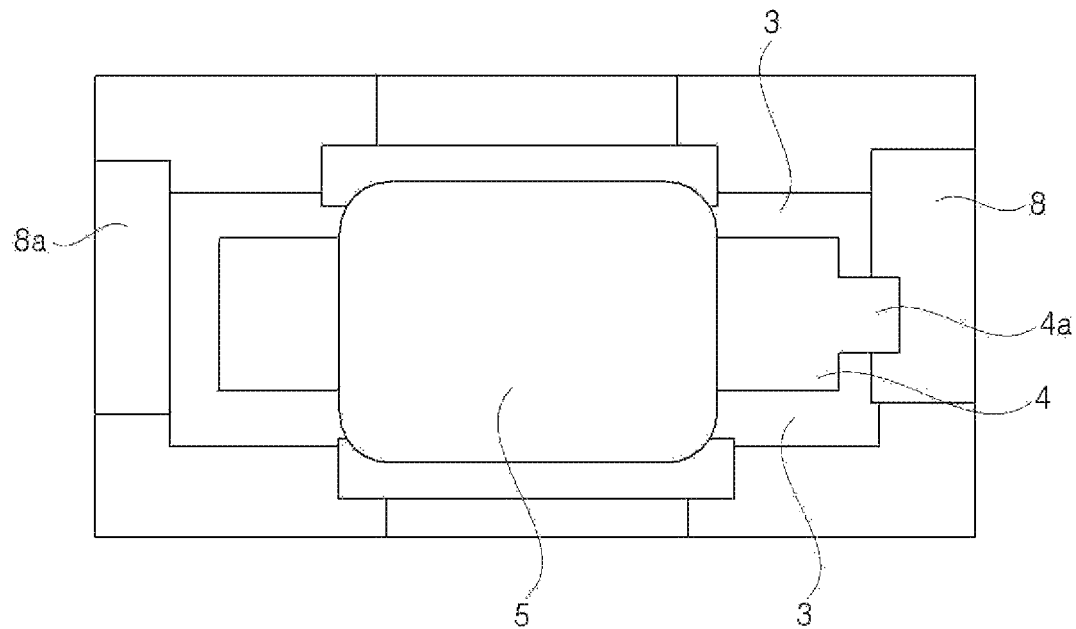
FIGS. 11A and 11B are plan and cross-sectional views illustrating a conventional protection device in which a fusible element (a low-melting metal body) is formed on a resistor.
Figure 11B:
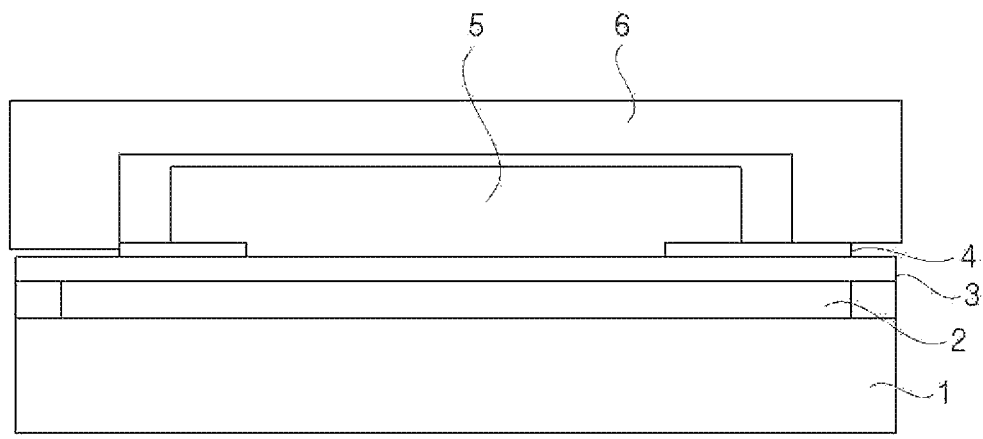

With reference to FIG. 10, in a complex protection device in another embodiment, a first surface-mounted resistive element 20 and a first printed resistive element 25 may be connected in parallel, a second surface-mounted resistive element 20a and a second printed resistive element 25a may be connected in parallel, the first and second surface-mounted resistive elements 20 and 20a may be connected in series, and the first and second printed resistive elements 25 and 25a may be connected in series, differently from the complex protection device in accordance with the former embodiment shown in FIG. 2.

As apparent from the above description, in a complex protection device intercepting current and voltage in an abnormal state in accordance with one embodiment of the present invention, a plurality of resistive elements may be combined in parallel and in series.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A complex protection device comprising:
   a substrate;
   fuse terminals provided on the substrate;
   first resistive terminals provided on the substrate so as to be separated from the fuse terminals;
   second resistive terminals provided on the substrate opposite to the first resistive terminals across the fuse terminals;
   a fusible element connected to the fuse terminals;

a first surface-mounted resistive element connected to the first resistive terminals;

a second surface-mounted resistive element connected to the second resistive terminals;

at least one printed resistive element connected to at least one of the first resistive terminals and the second resistive terminals and connected to at least one of the first surface-mounted resistive element and the second surface-mounted resistive element; and a switching element controlling flow of current to the first and second surface-mounted resistive elements and the at least one printed resistive element if overvoltage is applied, wherein the at least one printed resistive element is disposed under the first and second surface-mounted resistive elements, and the first and second surface-mounted resistive elements and the at least one printed resistive element are connected to the same resistive terminals.

2. The complex protection device according to claim 1, wherein each of the first and second resistive terminals includes a surface-mounted resistive terminal part to which one of the first and second surface-mounted resistive elements is connected, a printed resistive terminal part to which the at least one printed resistive element is connected, and a connection part connecting the surface-mounted resistive terminal part and the printed resistive terminal part, and the surface-mounted resistive terminal part, the printed resistive terminal part and the connection part are integrally formed.

3. The complex protection device according to claim 1, wherein the at least one printed resistive element includes first and second printed resistive elements respectively disposed under the first and second surface-mounted resistive elements.

4. The complex protection device according to claim 3, wherein the first and second surface-mounted resistive elements are connected in parallel and the first and second printed resistive elements are connected in parallel.

5. The complex protection device according to claim 4, wherein:

first and second connection terminals are formed between the first and second resistive elements;

a first insulating layer, a conductive layer, and a second insulating layer are sequentially stacked on the upper surfaces of the first and second connection terminals;

the fusible element, the first and second surface-mounted resistive elements, and the first and second printed resistive elements are installed on the second insulating layer; and a hole is formed on the second insulating layer so that the fusible element and the conductive layer may be connected through the hole.

6. The complex protection device according to claim 3, wherein:

the first surface-mounted resistive element and the first printed resistive element are connected in parallel, and the second surface-mounted resistive element and the second printed resistive element are connected in parallel; and the first and second surface-mounted resistive elements are connected in series, and the first and second printed resistive elements are connected in series.

* * * * *